United States Patent
von Fraunhofer (10) Patent No.: US 6,602,555 B1
(45) Date of Patent: Aug. 5, 2003

(54) TOBACCO EXTRACT COMPOSITION AND METHOD

(75) Inventor: Joseph A. von Fraunhofer, Baltimore, MD (US)

(73) Assignee: University of Louisville, Louisville, KY (US)

( * ) Notice: Subject to any disclaimer, the term of this patent is extended or adjusted under 35 U.S.C. 154(b) by 1543 days.

(21) Appl. No.: 08/504,679

(22) Filed: Jul. 20, 1995

Related U.S. Application Data (63) Continuation-in-part of application No. 08/349,966, filed on Dec. 6, 1994, now Pat. No. 5,435,941, which is a continuation-in-part of application No. 08/169,777, filed on Dec. 17, 1993, now abandoned.

(51) Int. Cl.[7] .............................. B05D 1/18; A24B 15/24
(52) U.S. Cl. ........................ 427/435; 427/445; 131/297; 131/290; 131/300; 131/302
(58) Field of Search ................................ 252/393, 392, 252/394, 387, 396; 106/14.22, 14.13, 14.14, 14.15, 14.16, 14.17, 14.34, 14.35, 14.37, 14.39; 422/16, 17; 131/290, 297, 300, 302; 427/435, 445

(56) References Cited

U.S. PATENT DOCUMENTS

| | | | |
|---|---|---|---|
| 50,006 A | 9/1865 | Hyde | 424/197.1 |
| 54,345 A | 5/1866 | Hickson | 424/197.1 |
| 88,519 A | 3/1869 | Russell | |
| 176,688 A | 4/1876 | Rosenthal | 424/197.1 |
| 229,130 A | 6/1880 | Hill | 424/197.1 |
| 256,847 A | 4/1882 | Mayer | 424/197.1 |
| 264,182 A | 9/1882 | Merrell | |
| 282,949 A | 8/1883 | Be Vier | 424/197 |
| 406,698 A | 7/1889 | Boogher | 252/180 |
| 728,258 A | 5/1903 | Lockwood | 210/698 |
| 1,717,905 A | 6/1929 | Alsberg | 210/698 |
| 1,841,763 A | 1/1932 | Sanftleben | 252/180 |
| 1,893,770 A | 1/1933 | Garbe | |
| 1,938,677 A | 12/1933 | Alsberg | 210/23 |
| 1,950,494 A | 3/1934 | Kobseff | 87/27 |
| 2,111,684 A | 3/1938 | Venable | 87/27 |
| 2,221,815 A | 11/1940 | Rice | 210/23 |
| 2,281,392 A | 4/1942 | Smead | 252/180 |
| 2,411,074 A | 11/1946 | Winkelmann | 252/83 |
| 2,777,818 A | 1/1957 | Gambill | 252/8.55 |
| 3,317,431 A | 5/1967 | Kaye | 252/180 |
| 3,596,766 A | 8/1971 | Johnston | 210/58 |
| 3,710,803 A | 1/1973 | Johnson | 131/140 P |
| 3,985,728 A | 10/1976 | Lin | 536/120 |
| 4,183,364 A | 1/1980 | Gumushan et al. | 131/143 |
| 5,065,775 A | 11/1991 | Fagg | 131/297 |
| 5,143,097 A | 9/1992 | Sohn | 131/356 |
| 5,435,941 A * | 7/1995 | Von Fraunhofer | 252/392 |

FOREIGN PATENT DOCUMENTS

GB 680567 10/1952

* cited by examiner

Primary Examiner—Katherine A. Bareford
(74) Attorney, Agent, or Firm—James Daly; Middleton Reutlinger (57) ABSTRACT

A method of extracting corrosion inhibiting constituents from tobacco comprises the steps of soaking tobacco in an extraction solution under certain extraction conditions, followed by filtration to remove tobacco residue from the resultant aqueous tobacco solution. This tobacco solution is used as a corrosion inhibitor to minimize the amount of corrosion occurring at galvanic corrosion cells that are established at areas of union of metals having different electrochemical potentials.

11 Claims, 9 Drawing Sheets

Type A Inhibitors
Type IA: reduce corrosion rate but do not completely prevent corrosion
Type IIA: provide temporary immunity by delaying onset of corrosion
Type IIIA: form passive film (oxide or insoluble salt) on metal surface

Type B Inhibitors
Type IB: retard corrosion process and are consumed during protective action
Type IIB: provide temporary immunity by reacting with corrosives Types IA, IIA and IIB are usually organic compounds
Types IIIA and IB are usually inorganic compounds

*Fig. 1*

| Class of Compound | Concentration (mg/kg) |
|---|---|
| Terpenes and alcohols | 350 |
| Polyphenols | 30 |
| Carboxylic acids | 2100 |
| Nitrogen-containing compounds | 240 |
| Alkaloids | 5-50 |

TOBACCO EXTRACT COMPOSITION AND METHOD

RELATED APPLICATION

This application is a continuation-in-part of my application entitled Tobacco Extract Composition and Method, Ser. No. 08/349,966, filed Dec. 6, 1994, now U.S. Pat. No. 5,435,941, which is a continuation-in-part of my application entitled TOBACCO EXTRACT COMPOSITION AND METHOD, Ser. No. 08/169,777, filed Dec. 17, 1993, now abandoned.

BACKGROUND OF THE INVENTION

1. Field of the Invention

The present invention relates to a composition and methods for production and use of industrial chemicals extracted from biomass, and more specifically, to a tobacco extract for corrosion inhibition treatment of metallic surfaces.

2. Description of the Prior Art

Corrosion is defined as the loss of the essential metallic properties of a metal. Corrosion consumes increasingly scarce raw materials and wastes the energy expended in the extraction and refining of metals as well as that involved in manufacturing components and structures. Since corrosion affects virtually every aspect of modern civilization, corrosion prevention is of major economic and environmental importance.

One approach to corrosion control is to add an inhibitor to the system. One way an inhibitor works is that it reacts with the metal to form a protective surface film. Typical examples are the inhibitors added to automobile cooling systems and corrosion-inhibiting pigments in protective paints for metals. However, many corrosion inhibitors in current use are toxic and/or have an adverse effect on the environment. There is increasing legislative pressure for the elimination of heavy metal compounds and toxic organic and inorganic corrosion inhibitors such that the development of effective and environmentally-friendly inhibitors is of major importance.

There have been few advances in the development of novel and effective corrosion inhibitors in recent years, while at the same time, there is a legislation-driven trend to eliminate many of the inhibitors in common use. Thus, inhibitors based on heavy metals, e.g., lead compounds, chromates, and those containing a variety of toxic anions, e.g., nitrites, phosphates and benzoates, are no longer acceptable. Consequently, a high proportion of corrosion inhibitors currently used in chemical industry, paint technology, metal finishing, cooling systems, and so forth require replacement by environmentally-acceptable substances. There is, however, little information on environmentally-acceptable corrosion inhibitors.

SUMMARY OF THE INVENTION

Tobacco products contain high concentrations of alkaloids, fatty acids and N-containing compounds, many of which inhibit metallic corrosion. Compounds leached from tobacco with water have the ability to inhibit metallic corrosion. In particular, tobacco extracts inhibit the galvanic corrosion of steel when coupled to copper in a sodium chloride solution, a solution known to rapidly corrode iron and steel. In fact, tobacco extracts appear to be more effective in inhibiting corrosion than the well known inhibitor, potassium chromate, under the same conditions.

There are numerous advantages of using tobacco extract as a metallic corrosion inhibitor. Initially, tobacco is a natural, renewable, environmentally benign, and relatively inexpensive source. In addition to leaves, tobacco waste (stems, twigs, etc.) can be used for corrosion inhibitor extraction. The active constituents (metallic corrosion inhibitors) in tobacco can be readily, inexpensively, and commercially extracted in a simple operation using only water as an extraction medium. In addition, the corrosion inhibitors in tobacco constituents can be extracted in a variety of additional or alternative media, as in steam, organic solvents, acids, etc. Treating metals and metallic surfaces with the extracted corrosion inhibitors can be effected by a number of currently used commercial methods, as in by dip or spray coating, electrostatic coating, or by formulating the corrosion inhibitors with paint or other coatings to be applied to the metallic surfaces in conventional commercial methods.

DETAILED DESCRIPTION OF THE INVENTION

Virtually all metals and alloys are subject to corrosion. One of the most common examples is surface discoloration, e.g., tarnish of silver or rusting of steel. Metal destruction by corrosion occurs through loss of metal ions directly into solution or by progressive dissolution of a surface film, typically an oxide or sulfide compound of the metal. Uniform attack is less destructive than localized or pitting attack, and the latter may cause catastrophic failure of structures or engineering components when there is progressive corrosion within the bulk of the metal.

Very few metals, e.g., gold and platinum, are inert, and most others rely upon an oxide film for their resistance to corrosion. Disruption of the protective film or the presence of a medium that causes dissolution of the film and prevents its re-formation will result in corrosion. Even in the absence of disruptive effects such as abrasion or scratching, oxide films often slowly dissolve or fall away from the metal surface, and then reform as the exposed metal surface is exposed to air or oxygen from its surrounding medium.

Corrosion is an electrochemical process, that is, there is passage of an electric current and movement of ions or electroactive species through solution followed by reaction at electrodes. Corrosion, therefore, results in the consumption of metals through reaction with their environment. Inhibition (prevention) of corrosion therefore involves transport of appropriate electroactive species through solution to the reacting metal surface, the electrode, where there is interaction with the metal surface and a reduction in the rate of metal dissolution. The deleterious effects of corrosion range from the unsightly tarnishing of silver, to the expensive rusting of automobiles, to a wide variety of allergic reactions from metals, to the almost incalculable costs of structural failures that result in loss of production and loss of life. Accordingly, corrosion prevention is of major importance. Four principal approaches are used in its prevention, namely, materials selection, surface coatings, anodic or cathodic protection, and environment modification.

Corrosion involves two concomitant reactions, an oxidation reaction at the anode and a reduction reaction at the cathode. In the case of zinc corroding in dilute acid, these reactions are:

Anode: $Zn \rightarrow Zn^{2+} + 2e$

Cathode: $2H^+ + 2e \rightarrow H_2$

These two reactions proceed at equal and opposite rates. In neutral and high pH media, the predominant cathodic reaction is reduction of oxygen to hydroxyl ions.

In most corrosion processes, the anodic reaction will continue until there is total consumption of the metal, unless (1) the metal can form a protective surface film ("passivation"), (2) the cathodic reactant is consumed (e.g., exhaustion without replenishment of dissolved oxygen in solution), or (3) the corrosion process is inhibited by additives to the medium. Depending upon the thermodynamics and kinetics of the overall reaction, corrosion may proceed slowly or rapidly, and occur as a general or localized attack. It is common, for example, that a pure metal may resist attack by a given reagent but will corrode quite rapidly when it contains impurities that facilitate an otherwise thermodynamically and/or kinetically unfavorable reaction. Similar effects occur if the medium contains a more readily reducible cathodic reactant than oxygen. For example, the atmospheric pollutant SO2 is some 1600 times more soluble in water than is oxygen ($O_2$), and is more readily reduced so that corrosion of steel occurs far more rapidly in urban (polluted) atmospheres than in rural areas.

When two metals are connected together in an electrolyte or conducting solution, the more electronegative metal will become the anode and corrode, while the more electropositive metal functions as the cathode. This form of corrosion cell is known as a galvanic cell or galvanic couple. This is the basis for the well-known protection of iron by galvanizing or zinc coating, where the zinc corrodes preferentially to the iron and is termed a sacrificial anode. Similar principles are utilized for the protection of underground pipelines, offshore oil rigs, shipping, etc.

Galvanic corrosion is common and numerous examples are known. Galvanic couples may be set up on areas of passivated (oxide coated) metals at breaks in the oxide layers or at perforations ("holidays") in protective coatings. Further, corrosion may be accelerated when a galvanic cell is established such that there is stimulation of the corrosion rate of a corrosion-resistant metal or of a metal that exhibits a low corrosion rate only in the absence of such cells. Galvanic couples may be established under a number of different circumstances. In all cases, differences in electrochemical potential between two metals or at different sites on the same metal will cause the creation of galvanic cells which result in corrosion.

The effects of galvanic corrosion vary with the nature and type of the individual galvanic cell. Extensive literature exists on corrosion and galvanic corrosion cells. One of the most common examples of galvanic corrosion is that occurring in the cooling system of automobile engines due to the presence of a variety of metals, typically cast iron, mild steel, copper and aluminum, as well as soldered and welded joints within the cooling system itself. In addition, ethylene glycol anti-freeze is very corrosive towards metals. Necessarily, therefore, all cooling systems require some form of corrosion inhibition, typically a benzoate-nitrite mixture.

Appropriate selection of materials may prevent, or at least significantly reduce, many corrosion problems, but considerations of cost, manufacturing methods, service requirements and conditions often dictate the choice of materials. Surface coatings, typically electrodeposited metals, galvanizing, polymeric coatings and paints, are used to provide corrosion protection, often through a barrier effect. Anodic or cathodic protection methods, typically sacrificial anodes or impressed current systems, are widely used for large structures such as buried pipelines, oil drilling rigs, ships and within chemical plants, and are very effective. Finally, when corrosion cannot be controlled by other means, modification of the environment may be required.

Environment modification involves either removal of corrosive agents or the addition of inhibitors, compounds that react with the metal to form a protective surface film or which remove or react with corrosive agents. Corrosion control in automotive cooling systems relies on inhibitors, typically a combination of sodium benzoate and sodium nitrite, added to protect the multi-component cooling system from corrosion by ethylene glycol antifreeze.

A combination of barrier action and inhibition occurs with protective paint coatings which contain leachable inhibitors that are transported to the metal substrate surface with ingress of fluids, and provide protection at the possible sites of attack. Protective paint coatings are a major method of protecting structures against corrosion, and they have the great advantage that they can be "tailored" to specific requirements and applications.

The selection of corrosion inhibitors used in industry and as pigments in protective paints, however, has been markedly affected by two legislation-driven developments, notably, the elimination of heavy metals and their compounds, and the impetus to use water-borne paints in place of organic solvent-borne paint systems. As a result, many traditional and highly effective inhibitor systems such as lead compounds, chromates and phosphates, are already prohibited or will shortly be prohibited on the grounds of toxicity and/or environmental effects. Environmental considerations have resulted in increased application of latex (water-borne) paints in place of solvent-borne or "oil-based" paints. Both trends significantly impact upon the formulation of protective paints and the methods of coating application. In brief, the paint industry and industry in general face a growing and urgent need to develop environmentally-acceptable and non-toxic corrosion inhibitors that function effectively in aqueous media.

Figure 1:
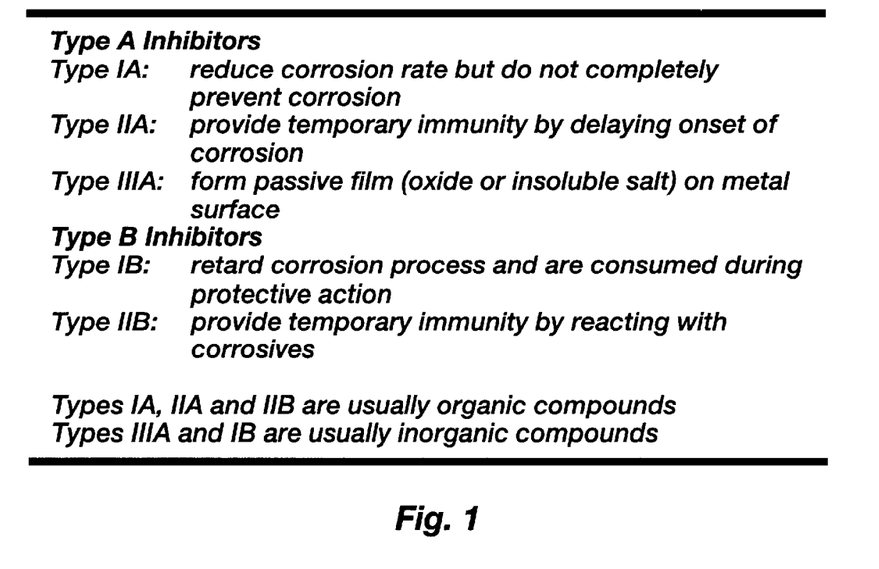
FIG. 1 is a listing of Type A and Type B corrosion inhibitors.

It is well established that certain substances will reduce and sometimes stop attack by acids on metals, this effect being known as inhibition of corrosion. In fact, numerous compounds can act as inhibitors in a wide variety of media. These compounds fall into two major classes of corrosion inhibitor, Type A and Type B, as shown in FIG. 1. Type A inhibitors react with the metal, typically by forming an inhibiting layer or film on the surface, while Type B inhibitors act by reducing the aggressiveness of the environment. Only Type IA and IIA inhibitors are relevant to this application of tobacco products.

There is no single mechanism of inhibitor action. However, Type A inhibitors (metal affecters) have been studied most. Types IA and IIA function by reacting with the metal (1) to form a surface film or (2) through selective adsorption onto active anodic (or cathodic) sites on the surface. This adsorption, even in the absence of metal-inhibitor chemical interactions, polarizes the anodic and/or cathodic reaction to provide the corrosion inhibition. Many Type IIA inhibitors incubate corrosion by forming chelate-type reaction products with the metal. In this type reaction, corrosion is inhibited as long as the chelate is present on the surface, with corrosion resuming if the chelate is decomposed or displaced by another surface film.

It is the nature of the chemisorbed layer on the metal formed by Type IA and IIA inhibitors, rather than its thickness per se, that determines inhibitor effectiveness. Non-specific adsorption of ions, or molecules that can form ions, depends upon the surface charge of the metal. At the point of zero charge (ZPC or $E^{q=0}$), adsorption of both ions and molecules can occur. When such adsorption occurs, the ZPC is shifted, in the case of anions, to slightly more negative values. For inhibition by anions, the metal must be held positive to its ZPC, i.e., the metal is positively charged. This generally occurs during corrosion of metals in acid solution. In neutral and basic media, an additional agent such as oxygen is generally required to maintain the metal corrosion potential, $E_{corr}$, positive to the ZPC, i.e., $E_{corr} > E^{q=0}$.

Effective adsorbing inhibitors include aliphatic and aromatic amines, sulphur-compounds such as thiourea and substituted thioureas, carboxylic acids and their salts, aldehydes and ketones, as well as numerous other organic substances. These substances exist either in the charged state, e.g., substituted ammonium cations $R_3NH^+$ in acid solution, or as neutral entities that are readily polarizable such that the active nitrogen atom in N-compounds acquires a net positive charge, and the active sulphur and oxygen atoms in S- and O-compounds acquire a net negative charge as the molecule approaches the metal surface. Thus, in addition to the high surface activity or absorbability of N-, S- and O-compounds due to the polarizability of the active S- and N- atoms in particular, the effect of metal surface charge on adsorption may be predicted. Accordingly, for $E > E^{q=0}$, adsorption of S- and O-compounds is favored while N-compound adsorption is preferred when $E < E^{q=0}$.

The amounts of any given inhibitor required for effective corrosion control vary with a number of factors, notably solution pH, salinity (chloride content) and temperature. Thus, the action of certain inhibitors can be very pH dependent. E.g., sodium nitrite is relatively ineffective below pH 6 (pH 7.0 being neutrality) and chromates and dichromates are generally effective only at pH values above 7. Likewise, as the salinity of water increases, the amount of inhibitor required also increases. E.g., for sodium nitrite ($NaNO_2$), 50 ppm is required for distilled water in a solution of 500 ppm NaCl; 300 ppm of $NaNO_2$ is necessary for 50% sea water solution.

Polyphosphates require the presence of divalent cations (e.g., $Ca^{2+}$ or $Zn^{2+}$, typically hard waters) to be effective, especially when chloride is present. These inhibitors function best at pH values below 6.0 for ferrous metals but the pH should be raised to 6–7 in mixed metal systems.

Certain inorganic inhibitors will actually accelerate metallic corrosion when present above a certain level (e.g. copper in triethanolamine phosphate).

| Compound | Amount used (% w/v) [approximate figures] | Cost |
|---|---|---|
| Sodium benzoate | 1.5–6.0 | $12.85/kg |
| Sodium nitrite | 0.3 | $15/kg |
| Sodium benzoate + Sodium nitrite | 1.5 + 0.1 | |
| Sodium chromate | 0.05–0.1 | $81.60/kg |
| Polyphosphates [Sodium pyrophosphate, Sodium tripolyphosphate, Sodium hexametaphosphate] | 50 ppm (as $P_2O_5$) | $11.90/kg [Sod. pyrophosphate: $40.60/kg] |
| Sodium silicate [Sodium metasilicate, Sodium orthosilicate] | 0.07–0.28 | [$15.60/kg $13/kg] |
| Triethanolamine phosphate | 0.14–0.28 | $48/kg |

Synergistic (and antagonistic) effects are often found with mixtures of inhibitors. These effects may be related to the charge in the electrical double layer (edl) present between an electrode (the metal surface) and its environment. The initial stage of adsorption is strongly influenced by the charge in the edl. Prior adsorption of anions, e.g., $HS^+$ and $Cl^-$, will lower the potential within the edl and so encourage adsorption of positively charged amines and other N-compounds.

The N- and 0-type compounds are relatively weakly adsorbed and thus tend to be discriminatory in their action, primarily affecting the anodic sites, although effectiveness of inhibition depends upon the molecular size. The primary bonding agent in adsorption is the lone pair of electrons on the O or N atom, although large molecules provide stearic hindrance over both neighboring anodic and cathodic areas so that there is cathodic and anodic inhibition. Aromatic amines and polyamines tend to lie flat on the metal surface. Therefore, their effectiveness of inhibition is a function of the area covered by the molecule, with secondary valence forces holding the molecule to the metal. There have been suggestions that lateral interactions between adjacent adsorbed molecules also increases inhibitive effects.

Figure 2:
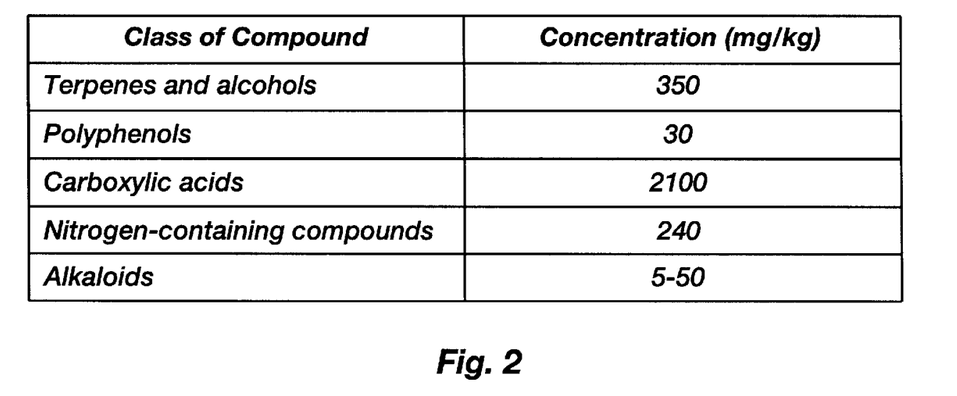
FIG. 2 is a table of the average concentrations in dry tobacco leaves of electrochemically active compounds.

At least 2549 individual constituents have been identified in tobacco products. However, of this wide variety of constituents, only a limited number are electrochemically active, such activity being dependent upon the presence of the polarizable nitrogen, oxygen and sulphur atoms. Additionally, polynuclear aromatic hydrocarbons might be electrochemically active, due to their fused benzene ring system with its attendant charge dislocation. The average concentrations in dry tobacco leaves of these electrochemically active compounds are summarized in FIG. 2.

Tobacco products contain high concentration of alkaloids, fatty acids and N-containing compounds, but despite the obvious and wide-spread interest and research into the pharmacological and carcinogenic characteristics of tobacco products, there appears to be no literature on their electrochemical behavior.

EXTRACTION PROCEDURE

Initial aqueous extractions were performed in 1% by weight saline solution at 65° C. (149° F.). These initial extractions and galvanic corrosion studies were performed using a saline solution in order to accelerate the corrosion analyses. In these corrosion studies (i.e., electrochemical tests), an electrical conducting electrolyte medium is necessary to ensure electrical continuity (conductivity) in the circuit (the test medium) to permit accurate electrical measurements to be made. Therefore, by initially using a saline (electrically conductive) solution for the aqueous tobacco constituents extraction, the galvanic corrosion analyses could be run immediately.

Following the initial tobacco constituent extractions in 1% saline aqueous solutions, the inventor performed subsequent tobacco constituent extractions in (1) room temperature (22° C., 72° F.) saline solutions; (2) heated and room temperature water solutions; and (3) heated and room temperature 10% sulfuric acid solutions. In each of these tobacco constituent extractions, the mechanical procedure was the same. The tobacco product was stirred into the extraction medium, namely water, saline or acid solution in a large beaker, and was agitated by a magnetic stirrer over a period of 4 hours. The mix was filtered through a standard laboratory filter paper in a conical funnel, and the various metallic surfaces were immersed in individual containers of the filtrate solution for the specified times.

GALVANIC CORROSION STUDIES

The prepared tobacco extract solution was used for specific galvanic corrosion cell zero resistance ammetry analyses of the current density/time relationships of galvanic couples of various metal combinations, and compared to analyses of current density/time relationships of these same galvanic couples in 1% saline solution with and without the addition of 1% potassium chromate. Results of these analyses indicate that extracts leached from these various types of tobacco inhibited corrosion within these galvanic couple corrosion cells in 1% saline solution considerably better than additions of 1% potassium chromate, commonly used as a corrosion inhibitor.

Three series of these electrochemical corrosion tests were performed to evaluate the electrochemical behavior and the corrosion inhibition potential of tobacco constituents and to compare their efficacy with that of aqueous extracts from smokeless tobacco.

Galvanic corrosion cells are established wherever metals of different electrochemical potential are coupled together or where there are differences in electrochemical activity arising from variations in such factors as pH and aeration. Galvanic corrosion currents may be accurately studied by means of zero resistance ammetry, ZRA. In ZRA, the feedback current of the operational amplifier of a potentiostat is used to maintain a zero potential difference between the two metals of the galvanic couple. The magnitude of the feedback current is identical to that flowing in the galvanic cell. This technique was used to obtain the following data:

a. the magnitude of the corrosion currents flowing in cells formed by combinations of dissimilar metals;

b. the effect of tobacco constituents on the galvanic corrosion currents;

c. changes in the effect of tobacco constituents on galvanic corrosion currents as a function of electrolyte pH; and d. the effect of elevated temperature on inhibition of galvanic corrosion by tobacco constituents.

The data obtained indicate the protective efficacy of constituents from different tobaccos on corrosion in galvanic cells, and indicate the effect of solution pH and solution temperature on the inhibitive effects.

Accordingly, studies were performed using the rapid and convenient zero resistance ammetry (ZRA) technique.

EXAMPLE 1

Figure 3:
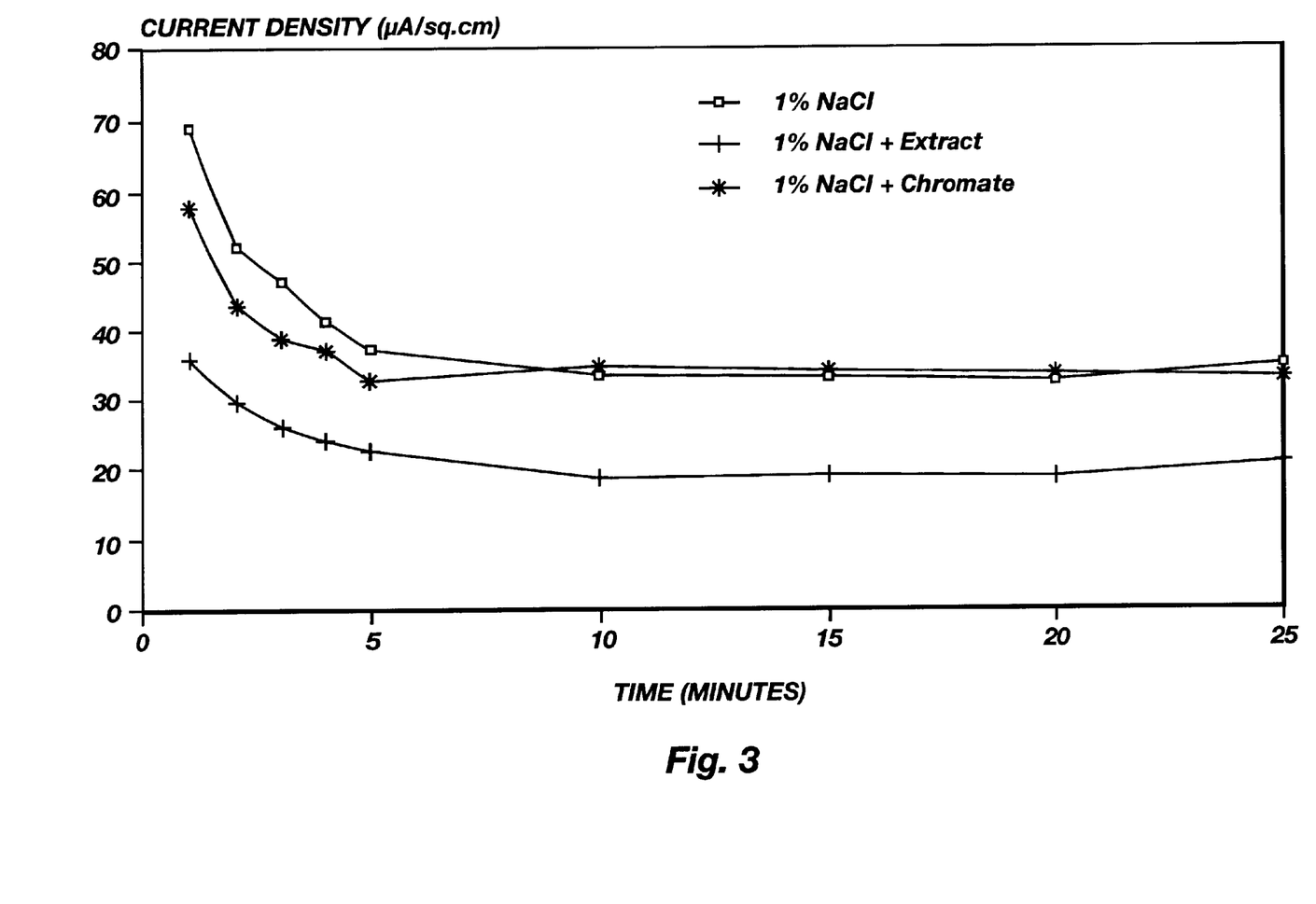
FIG. 3 is a current density/time relationship graph of a copper-steel galvanic couple in solutions of saline, saline and potassium chromate, and saline and tobacco extract.

A tobacco extract test medium was prepared by digesting 5 g of commercial chewing tobacco (Red Man chewing tobacco, Pinkerton Tobacco Co, Owensboro, Ky.) in 500 ml of 1% saline for a period of 4 hours. A study compared the effects of 1% NaCl solution, 1% saline containing the tobacco extract and 1% saline containing 1% of the known inhibitor, potassium chromate, on the industrially important copper-steel galvanic couple. The current density/time relationships of the galvanic couple in these solutions are shown in FIG. 3. Increased corrosion inhibition is denoted by a lower current density.

This study on the copper-steel galvanic couple clearly shows that a simple aqueous extract of smokeless tobacco leached out a powerful corrosion inhibitor, one that is more effective and more rapid in its action than the well-established anodic passivating inhibitor, potassium chromate.

EXAMPLE 2

Figure 4:
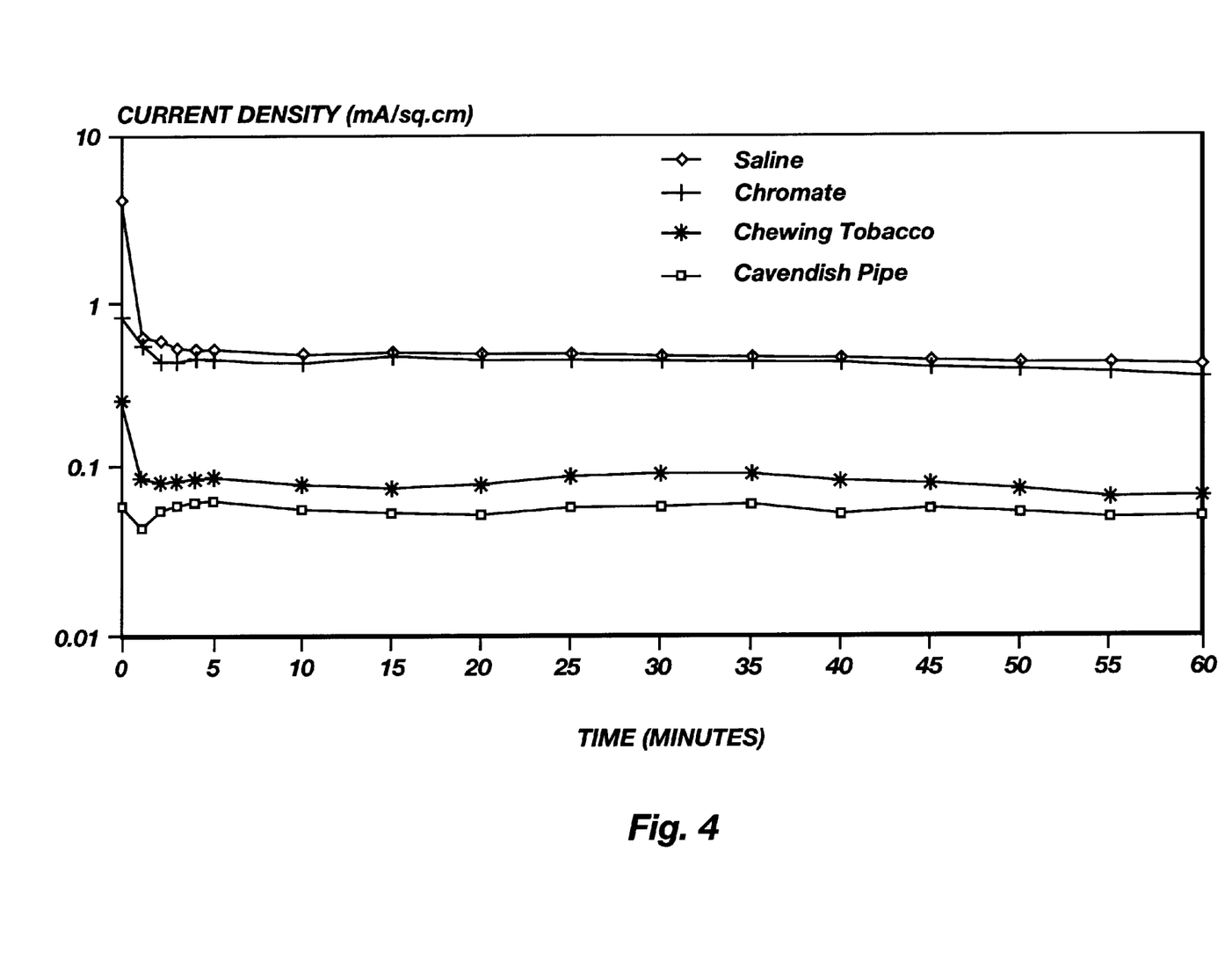
FIG. 4 is a current density/time relationship graph of a steel-platinum galvanic couple in solutions of saline, saline and potassium chromate, saline and chewing tobacco extract, and saline and pipe tobacco extract.

ZRA studies of mild steel coupled to platinum, a very active cathode, in 1% saline solution, with and without potassium chromate, smokeless tobacco extract and Cavendish smoking tobacco extract are shown in FIG. 4. Again, a lower current density denotes a greater degree of corrosion inhibition. Note that both tobacco extracts are more effective corrosion inhibitors, i.e., produce a lower current density, than the standard corrosion inhibitor, potassium chromate.

EXAMPLE 3

Figure 5:
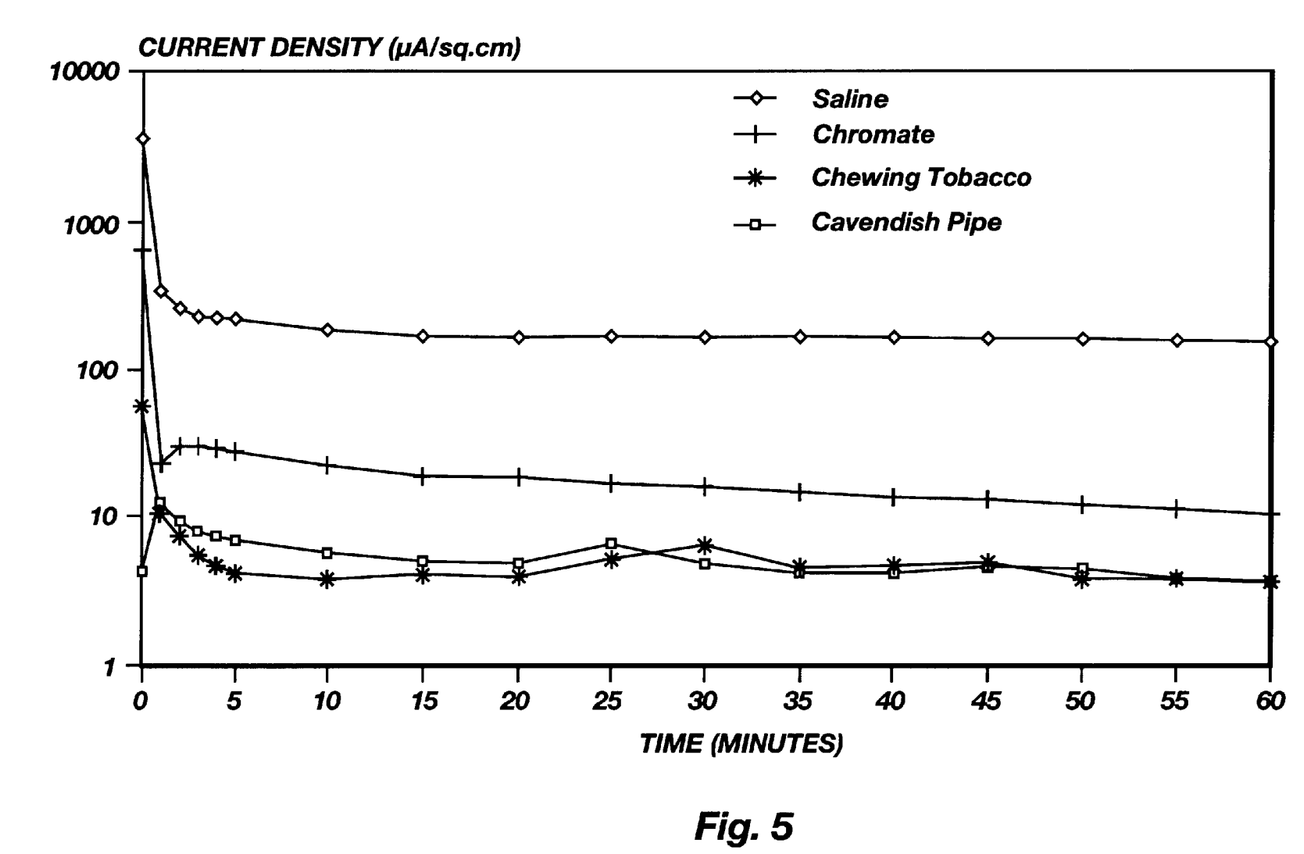
FIG. 5 is a current density/time relationship graph of a brass-platinum galvanic couple in solutions of saline, saline and potassium chromate, saline and chewing tobacco extract, and saline and pipe tobacco extract.

ZRA studies of brass coupled to platinum in 1% saline solution, with and without potassium chromate, smokeless tobacco extract and Cavendish smoking tobacco extract are shown in FIG. 5. Again, a lower current density denotes a greater degree of corrosion inhibition. Both tobacco extracts are considerably more effective corrosion inhibitors, i.e., produce a lower current density, than potassium chromate.

EXAMPLE 4

Figure 6:
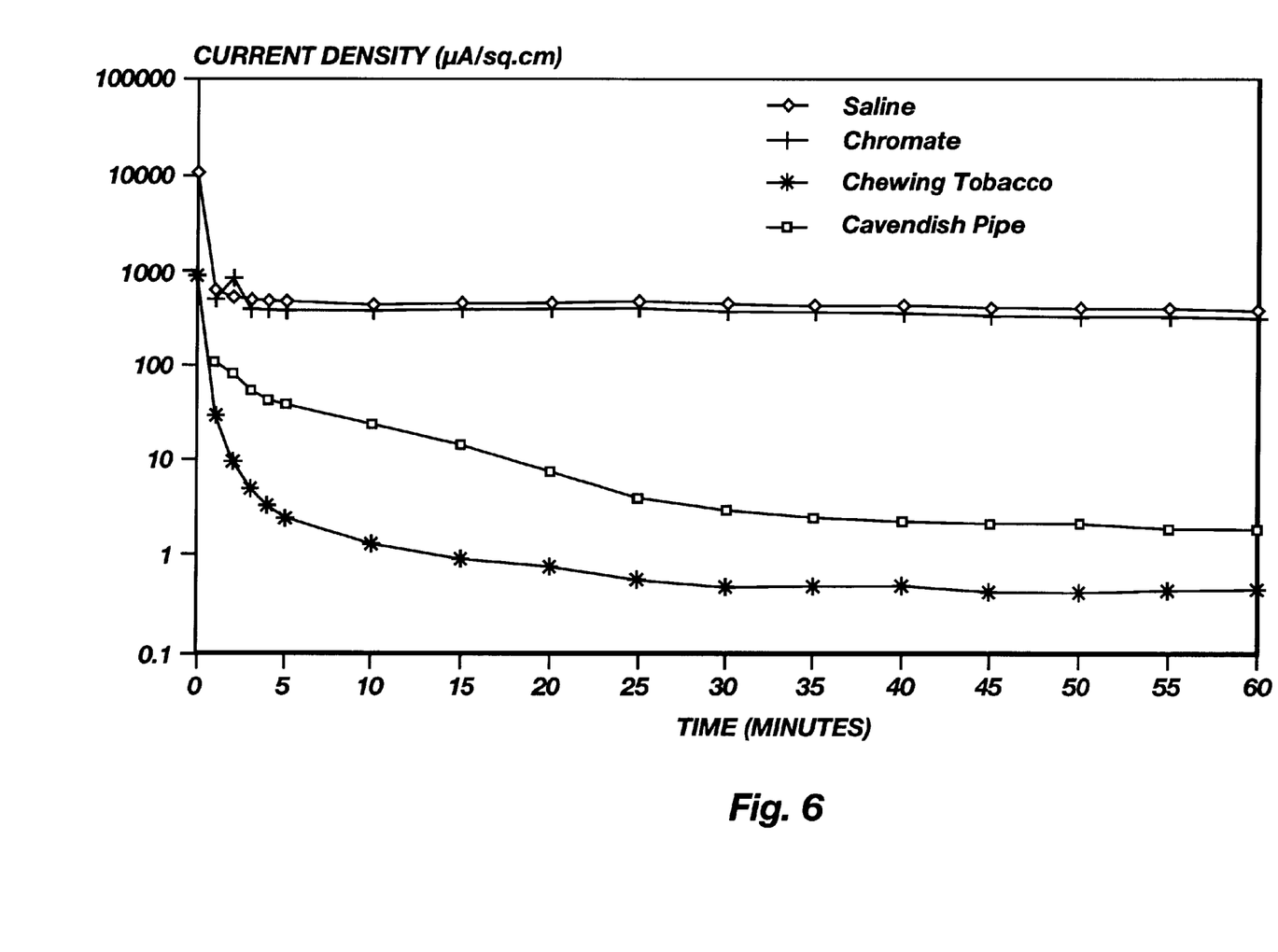
FIG. 6 is a current density/time relationship graph of a aluminum-platinum galvanic couple in solutions of saline, saline and potassium chromate, saline and chewing tobacco extract, and saline and pipe tobacco extract.

ZRA studies of aluminum coupled to platinum in 1% saline solution, with and without potassium chromate, smokeless tobacco extract and Cavendish smoking tobacco extract are shown in FIG. 6. A lower current density denotes a greater degree of corrosion inhibition. Both tobacco extracts are more effective corrosion inhibitors, i.e., produce a lower current density, than potassium chromate.

EXAMPLE 5

Figure 7:
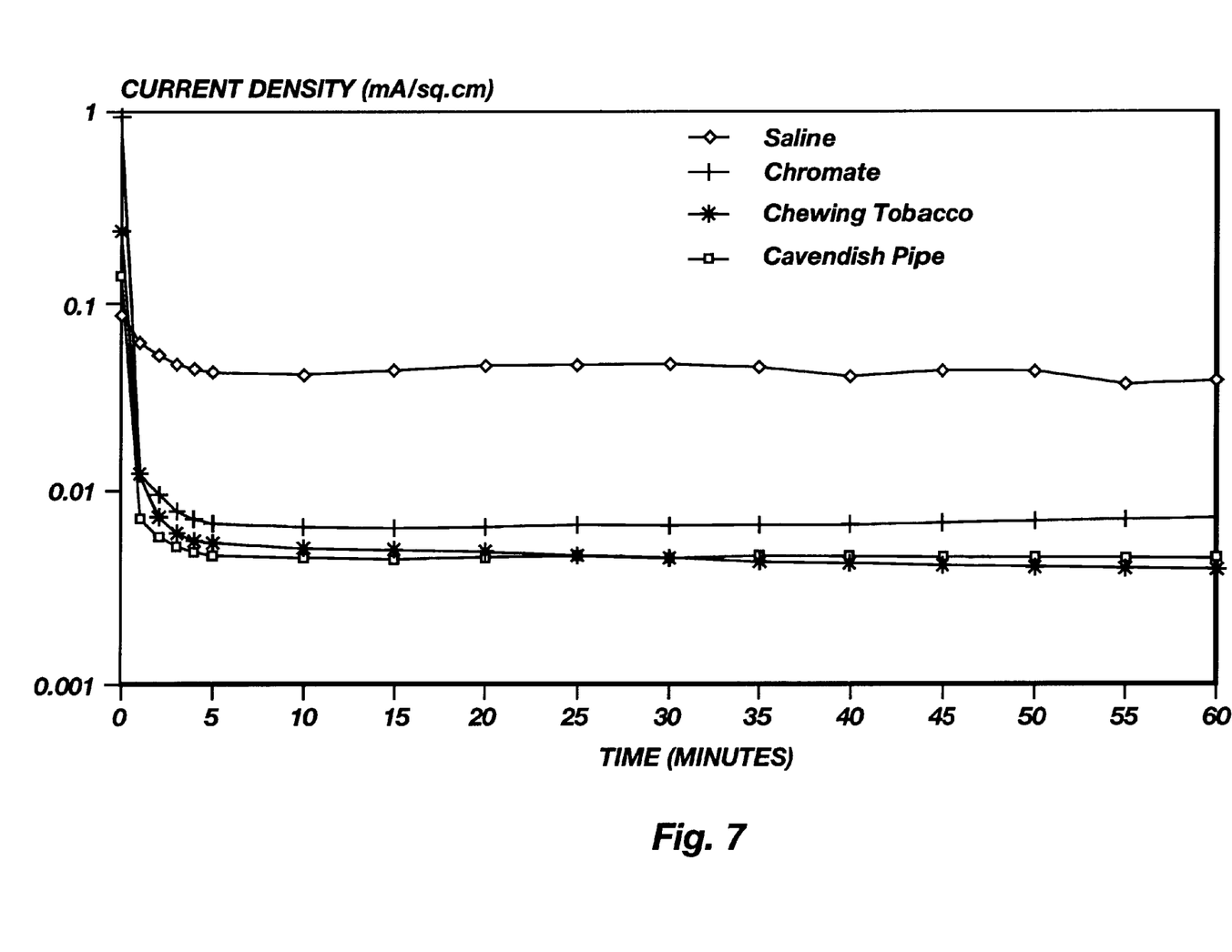
FIG. 7 is a current density/time relationship graph of a steel-brass galvanic couple in solutions of saline, saline and potassium chromate, saline and chewing tobacco extract, and saline and pipe tobacco extract.

ZRA studies of mild steel coupled to brass in 1% saline solution, with and without potassium chromate, smokeless tobacco extract and Cavendish smoking tobacco extract are shown in FIG. 7. A lower current density denotes a greater degree of corrosion inhibition. Both tobacco extracts are more effective corrosion inhibitors, i.e., produce a lower current density, than potassium chromate.

EXAMPLE 6

Figure 8:
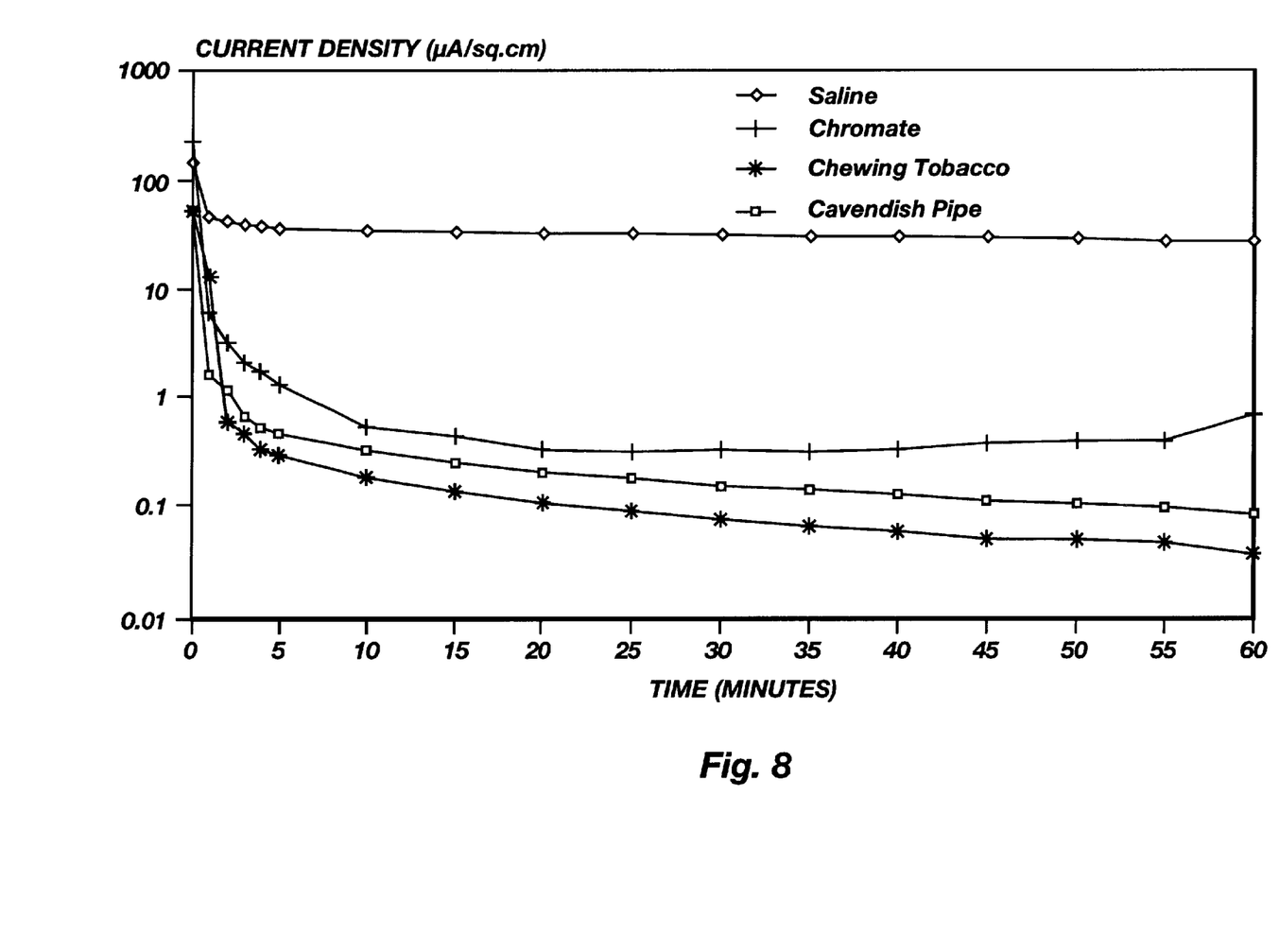
FIG. 8 is a current density/time relationship graph of a steel-aluminum galvanic couple in solutions of saline, saline and potassium chromate, saline and chewing tobacco extract, and saline and pipe tobacco extract.

ZRA studies of mild steel coupled to aluminum in 1% saline solution, with and without potassium chromate, smokeless tobacco extract and Cavendish smoking tobacco extract are shown in FIG. 8. A lower current density denotes a greater degree of corrosion inhibition. Both tobacco extracts are more effective corrosion inhibitors, i.e., produce a lower current density, than potassium chromate.

EXAMPLE 7

Figure 9:
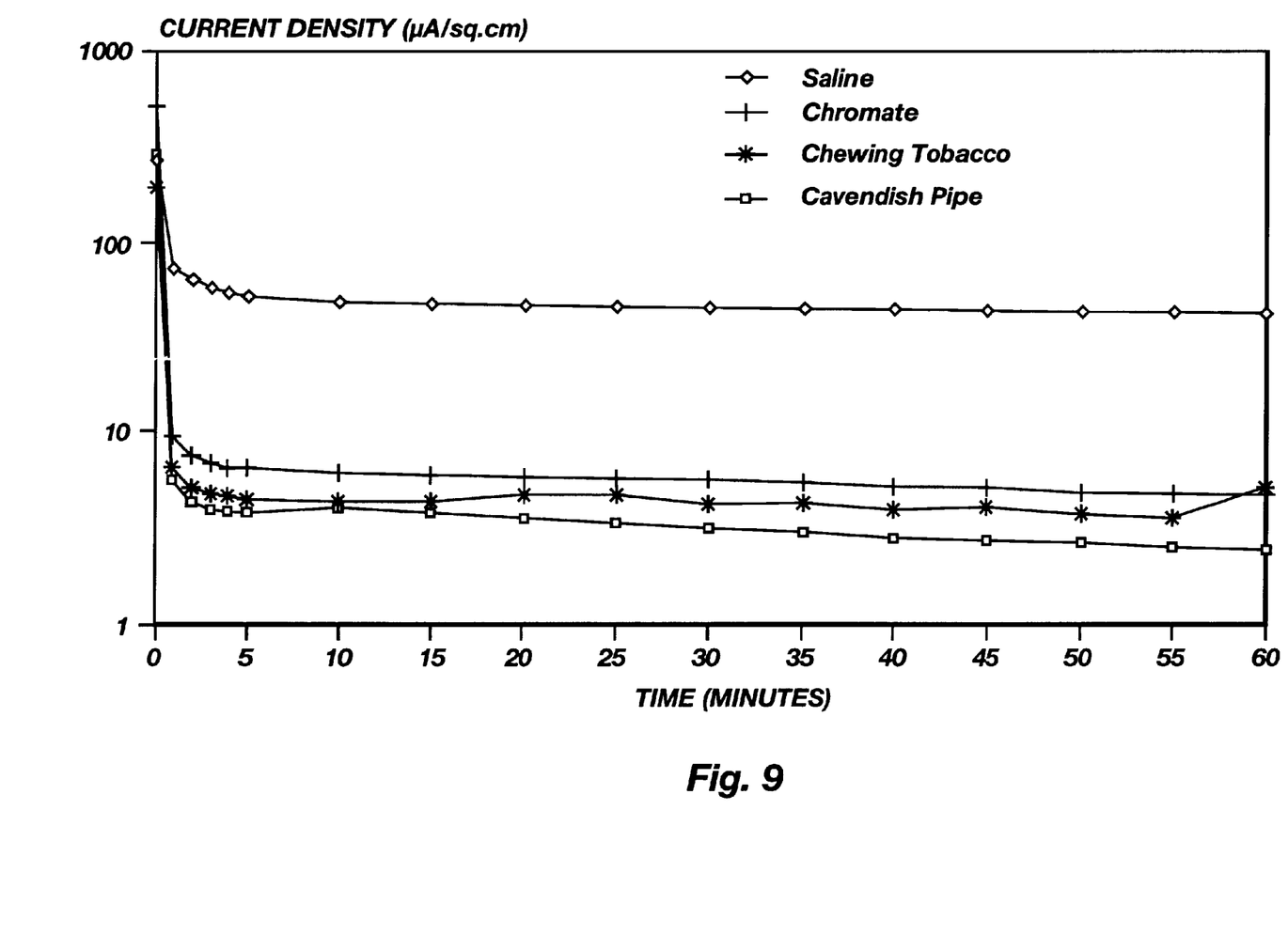
FIG. 9 is a current density/time relationship graph of a aluminum-brass galvanic couple in solutions of saline, saline and potassium chromate, saline and chewing tobacco extract, and saline and pipe tobacco extract.

ZRA studies of aluminum coupled to brass in 1% saline solution, with and without potassium chromate, smokeless tobacco extract and Cavendish smoking tobacco extract are shown in FIG. 9. A lower current density denotes a greater degree of corrosion inhibition. Both tobacco extracts are more effective corrosion inhibitors, i.e., produce a lower current density, than potassium chromate.

These data clearly demonstrate the effectiveness of aqueous tobacco extracts in corrosion inhibition.

EXAMPLE 8

Figure 10:
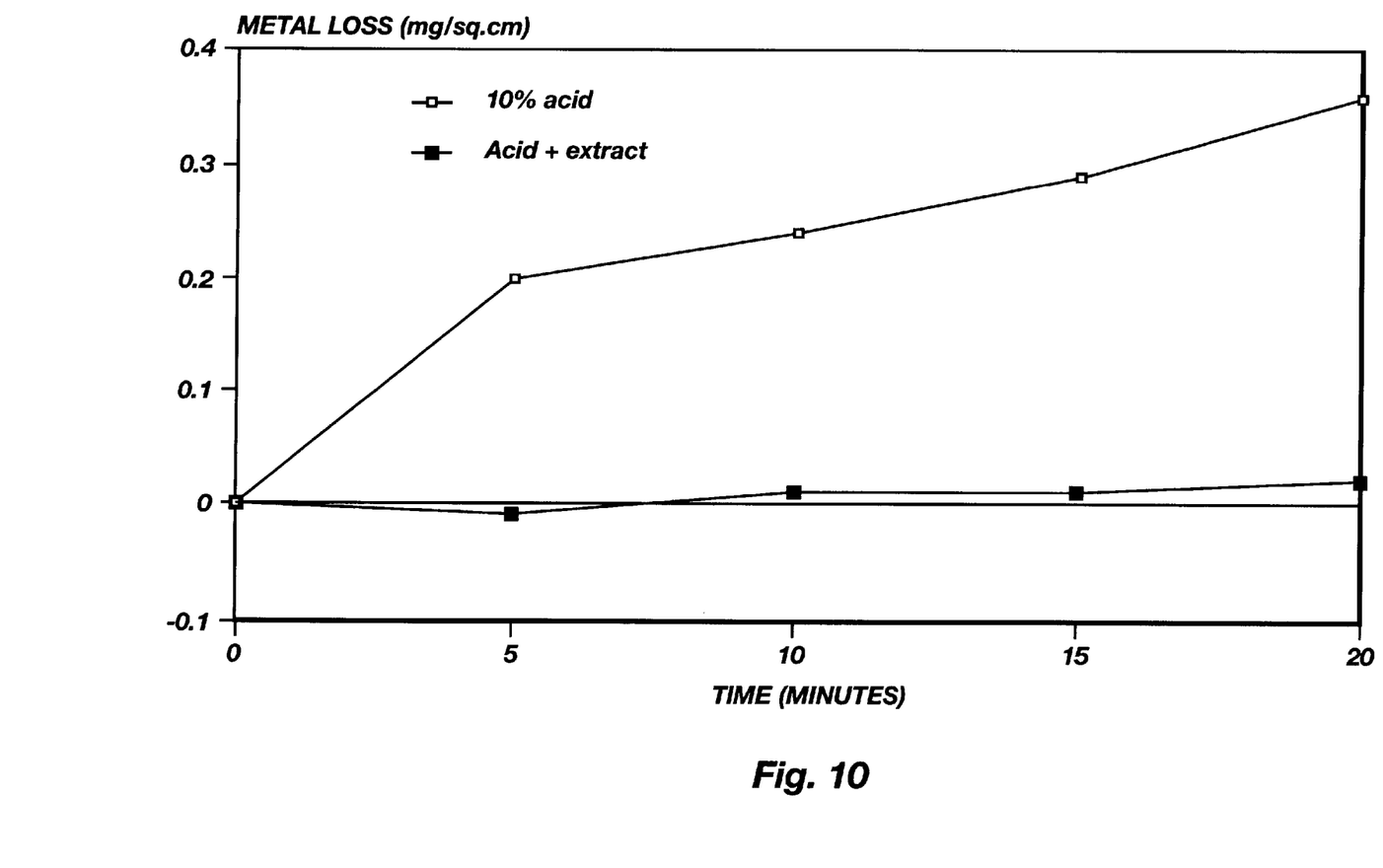
FIG. 10 is metal loss/time graph showing the surface loss of mild steel in a 10% sulfuric acid solution and a 5% tobacco extract concentration added to the 10% acid solution.

Additional work has been performed on corrosion inhibition of 10% sulfuric acid, a medium commonly used in the metal finishing and metal processing industries for descaling steel prior to electroplating, painting, and other surface coating procedures, as well as prior to most metal working operations. Scrap burley twigs and stems, after stripping of leaves and shoots for processing into tobacco products, were digested in 10% $H_2SO_4$ solution to provide a concentration of 5% extract in the acid. Mild steel was then immersed in plain acid and the acid-burley extract for 5 minute intervals up to a total of 20 minutes, weight changes being recorded after each 5 minute period. The weight loss data are shown in FIG. 10. As indicated, the 10% acid solution etched away surface metal in an essentially linear time relationship following an initial period of accelerated metal loss during the first five minute interval, whereas, the acid-barley extract maintained the metal loss at a near-zero level for at least 15 minutes before permitting the rate of metal loss to increase slightly some time during the fourth five minute period.

This work clearly demonstrates the inhibitive effect of burley twigs and stems, materials that are discarded during tobacco processing.

The extracted corrosion inhibitors may be used to treat metallic surfaces in any number of conventional methods, such as dip- or spray-coating, electrostatic coating, etc. In addition, the extracted corrosion inhibitors may be combined with, or otherwise formulated with, paint or other surface coating material, to effect the corrosion inhibition of such painted or coated metallic surface.

ALTERNATIVE EXTRACTION PROCEDURES

There exist numerous alternative extraction procedures involving different extraction media for extracting the metallic corrosion inhibiting components from tobacco. One of these procedures is supercritical fluid extraction (SFE). There are three different modes of extraction procedure using SFE technology: (1) static extraction; (2) dynamic extraction; and (3) a combination static/dynamic extraction.

In the static mode SFE procedure, tobacco is introduced into a specified amount of supercritical fluid at a specified temperature. Frequently, the extraction vessel is pressurized to enhance the interaction between the metallic corrosion inhibitors in the tobacco and the supercritical fluid. In addition, the specified amount of supercritical fluid solution may be recirculated within the extraction vessel to enhance the extraction process. In addition, frequently the static extraction process is followed by a specified period of time of dynamic extraction in order to maximize the extraction process.

When the extraction is complete, the solid tobacco residue is removed from the supercritical fluid solution, commonly by mechanical filtering, and the resulting supercritical fluid solution containing the metallic corrosion inhibitors extracted from the tobacco can be used in a number of applications to treat specific metallic surfaces for corrosion inhibition.

In a dynamic extraction process, fresh supercritical fluid is continually passed through the tobacco product, similar to the way a coffee maker percolates fresh water through ground coffee beans. This process, obviously, utilizes much more of the supercritical fluid than the static SFE process. In addition, there is a greater opportunity for impurities in the supercritical fluid to contaminate, or otherwise affect the efficiency of, the extraction process and/or the resulting extracted metallic corrosion inhibitors.

A combination initial static extraction followed by a secondary dynamic extraction, as mentioned above, appears to be the preferred mode for the extraction of metallic corrosion inhibiting components from tobacco. In this process, the static extraction is carried out as above-described for a predetermined period of time. Following the static extraction, the supercritical fluid/metallic corrosion inhibitor component solution is transferred, generally in a closed system, into an apparatus for dynamic extraction. In the transferring, the supercritical fluid/metallic corrosion inhibiting component solution is removed, and replaced with fresh supercritical fluid, which is then passed through the tobacco in the dynamic extraction process. The metallic corrosion inhibitors in solution are then utilized to treat metallic surfaces for corrosion inhibition. It has also been found that a number of static/dynamic extraction cycles may be used to maximize the efficiency with which the metallic corrosion inhibitors may be extracted from the tobacco product.

The inventor has also determined that metallic corrosion inhibitors may be extracted from tobacco by the use of media other than water, saline aqueous solutions, and supercritical fluids. In one of these alternative methods, metallic corrosion inhibitors may be extracted from tobacco in an oil medium solution, following a procedure similar to that utilized in the previously described water and 1% saline solutions. Variations of the oil medium solution extraction method would include performing the extraction step at specified ranges of temperatures and pressures, agitating the tobacco in the oil medium solution, and recirculating the oil medium solution for improved extraction efficiency. Other embodiments of metallic corrosion inhibitor extraction from tobacco comprise extraction in various emulsion media and various alkaline and salt (basic) solution media. Again, the procedure to be followed would be essentially identical to that described above with relation to the water, 1% saline, and oil medium extraction procedures.

Lastly, metallic corrosion inhibitors may be extracted from tobacco in a steam medium at specified temperatures and pressures, followed by condensing the steam, including the extracted corrosion inhibitors, into solution for treating metallic surfaces with the inhibitors.

Cementitious compounds, typically Portland cement, plaster and concrete, are mixed with water to produce a plastic mass that sets to a solid mass. When dry, these materials exhibit high compressive strength and good durability. However, when wet, they tend to be unstable with a high pH so that they are subject to degradation by low pH media, typically acid rain. Further, because they lack tensile strength, cementitious substances, such as concrete used for construction purposes, are often reinforced with steel rods to increase their resistance to tensile and flexural loads. The high pH of the cementitious mass has a deleterious effect on many metals. Iron and steel, for example, will corrode when imbedded in cement or concrete that has imbibed water, thereby releasing the basic substances that raise the pH at the metal surface. The incorporation of tobacco extracts in the mixing water for the cement, cement-render, plaster or concrete will have no adverse effects on the mechanical or physical properties of the set mass but will function as a corrosion inhibitor for the metal surface. The mechanism for this action is that when rain water, for example, enters the set mass, it will release the tobacco extract which will migrate with the inward diffusing water to the metal surface and inhibit the corrosion that otherwise would occur at the metal surface.

Sodium chloride, salt, and similar chemicals are used as de-icing agents on ice- and snow-covered roadways etc. to melt the ice layer and reduce the risk of slippage and loss of traction by motor vehicles, pedestrians etc. Although these de-icing salts are effective in melting ice by lowering the freezing point of the salt water mix that forms when salt is spread over ice, the resultant brine solution is a highly aggressive electrolyte that will corrode many metals, notably iron and steel. Incorporating the corrosion-inhibitive tobacco extract in the de-icing medium, probably as a dry powder that will be activated when the "salt" becomes wetted on application to snow and ice, will provide an effective means of reducing the corrosive attack on motor vehicles and other metallic structures that are exposed to the brine solution formed during de-icing operations.

A variety of media are used during such metal-working operations as drilling, milling, cutting, grinding, polishing and so forth to aid the cutting action of the abrasive medium or cutting tool through a lubricating action as well as provide cooling during the metal removal process. Such media often are water-based, e.g. emulsion cutting fluids, or contain varying amounts of water. If these media are left on the metal surface after the operations are finished, corrosion of the metal surface may occur. Further, during the metal-working operations, metallic particles and other matter are introduced from the metal workpiece surface as well as from the cutting or metal working tool. Because these substances accumulate within the cutting fluid, they may deposit out on other pieces of metal during subsequent metal-working operations. Such deposits may establish galvanic corrosion cells if their depositions result in local or general differences in chemical composition, metallurgical structure, pH, or aeration on the metal workpiece surface. The presence of tobacco extract with its known anti-corrosive (corrosion inhibitive) properties would reduce the risk of metal damage due to corrosion caused by the residual cutting fluid on the metal surface or extraneous matter deposited during such metal working operations.

From the foregoing it will be seen that this invention is one well adapted to attain all of the ends and objectives herein set forth, together with other advantages which are obvious and which are inherent to the composition and method. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

What is claimed is:

1. A method of treating metallic surfaces for corrosion inhibition, comprising the steps of:
   a. introducing tobacco into a solution selected from the group consisting of alkaline media and basic media;
   b. extracting tobacco residue from the tobacco in solution;
   c. recirculating the solution during the extraction step; and
   d. applying the tobacco residue extracted in accordance with step "b" to the metallic surface.

2. A method of treating metallic surfaces for corrosion inhibition, comprising the steps of:
   a. introducing tobacco into a solution selected from the group consisting of alkaline media and basic media;
   b. extracting tobacco residue from the tobacco in solution, the extracting being a static extraction followed by a dynamic extraction; and
   c. applying the tobacco residue extracted in accordance with step "b" to the metallic surface.

3. A method of treating metallic surfaces for corrosion inhibition, comprising the steps of:
   a. introducing tobacco into a solution selected from the group consisting of alkaline media and basic media;
   b. extracting tobacco residue from the tobacco in solution;
   c. combining the tobacco residue with a medium for treating metallic surfaces, wherein the medium for treating metallic surfaces is water for combination with cementitious substances to inhibit corrosion on reinforcing rods and metal structures; and
   d. applying the tobacco residue and the medium to the metallic surface.

4. A method of treating metallic surfaces for corrosion inhibition, comprising the steps of:
   a. introducing tobacco into a solution selected from the group consisting of alkaline media and basic media;
   b. extracting tobacco residue from the tobacco in solution;
   c. combining the tobacco residue with a medium for treating metallic surfaces, wherein the medium for treating metallic surfaces is a de-icing agent; and
   d. applying the tobacco residue and the medium to the metallic surface.

5. A method of treating metallic surfaces for corrosion inhibition, comprising the steps of:
   a. introducing tobacco into a solution selected from the group consisting of alkaline media and basic media;
   b. extracting tobacco residue from the tobacco in solution;
   c. combining the tobacco residue with a medium for treating metallic surfaces, wherein the medium for treating metallic surfaces is a metal machining fluid; and
   d. applying the tobacco residue and the medium to the metallic surface.

6. A method of treating metallic surfaces for corrosion inhibition, comprising the steps of:
   a. introducing tobacco into a steam environment;
   b. agitating the tobacco in the steam environment;

c. extracting tobacco residue from the tobacco in the steam environment; and d. applying the tobacco residue extracted in accordance with step "c" to the metallic surface.

7. A method of treating metallic surfaces for corrosion inhibition, comprising the steps of:

a. introducing tobacco into a steam environment;

b. extracting tobacco residue from the tobacco in the steam environment;

c. recirculating the steam during the extraction step; and d. applying the tobacco residue extracted in accordance with step "b" to the metallic surface.

8. A method of treating metallic surfaces for corrosion inhibition, comprising the steps of:

a. introducing tobacco into a steam environment;

b. extracting tobacco residue from the tobacco in the steam environment;

c. removing solid tobacco residue from the steam environment; and d. applying the tobacco residue extracted in accordance with step "b" to the metallic surface.

9. A method of treating metallic surfaces for corrosion inhibition, comprising the steps of:

a. introducing tobacco into a steam environment;

b. extracting tobacco residue from the tobacco in the steam environment;

c. combining the tobacco residue with a medium for treating metallic surfaces, wherein the medium for treating metallic surfaces is water for combination with cementitious substances to inhibit corrosion on reinforcing rods and metal structures; and d. applying the tobacco residue and the medium to the metallic surface.

10. A method of treating metallic surfaces for corrosion inhibition, comprising the steps of:

a. introducing tobacco into a steam environment;

b. extracting tobacco residue from the tobacco in the steam environment;

c. combining the tobacco residue with a medium for treating metallic surfaces, wherein the medium for treating metallic surfaces is a de-icing agent; and d. applying the tobacco residue and the medium to the metallic surface.

11. A method of treating metallic surfaces for corrosion inhibition, comprising the steps of:

a. introducing tobacco into a steam environment;

b. extracting tobacco residue from the tobacco in the steam environment;

c. combining the tobacco residue with a medium for treating metallic surfaces, wherein the medium for treating metallic surfaces is a metal machining fluid; and d. applying the tobacco residue and the medium to the metallic surface.

* * * * *